United States Patent [19]
Carosa

[11] Patent Number: 5,216,402
[45] Date of Patent: Jun. 1, 1993

[54] SEPARABLE INDUCTIVE COUPLER

[75] Inventor: Paul F. Carosa, Los Angeles, Calif.

[73] Assignee: Hughes Aircraft Company, Los Angeles, Calif.

[21] Appl. No.: 823,944

[22] Filed: Jan. 22, 1992

[51] Int. Cl.$^5$ .................. H01F 15/02; H01F 27/30
[52] U.S. Cl. ............................ 336/66; 336/83; 336/205; 336/223; 336/DIG. 2
[58] Field of Search .............. 336/83, 66, 212, 96, 336/223, 205, DIG. 2, 180, 183, 210

[56] References Cited
U.S. PATENT DOCUMENTS

| | | | |
|---|---|---|---|
| 3,346,828 | 10/1967 | Buschman | 336/205 |
| 3,430,174 | 2/1969 | Kogo et al. | 336/205 |
| 4,362,990 | 12/1982 | Schneider et al. | 336/212 |
| 4,543,556 | 9/1985 | Taylor et al. | 336/DIG. 2 |
| 4,833,437 | 5/1989 | Williamson | 336/83 |

Primary Examiner—Thomas J. Kozma
Attorney, Agent, or Firm—L. A. Alkov; W. K. Denson-Low

[57] ABSTRACT

A separable inductive coupler for transferring electrical power across a dielectric medium using magnetic induction. Its coil geometry allows for easy disassembly of primary and secondary circuits. When primary and secondary coils are mated, an extremely low leakage inductance transformer is formed. This provides for good high frequency operation at high power density. The coupler allows electrical power transfer without metal-to-metal contact. The design allows easy removal of the primary or secondary coil from the transformer. The coil geometry has very low leakage inductance and very low high-frequency resistance which allows high frequency operation. The power transfer density is much higher than previously achieved with separable inductive couplers. Approximately 6000 watts has been transferred through a version of the present separable inductive coupler having a volume of 25.8 cubic inches, yielding a power density of 230 Watts/cubic inch. The coupler is adapted to provide a safe, convenient and weatherproof device for coupling power to a load, such as an electric vehicle to recharge its propulsion battery.

19 Claims, 3 Drawing Sheets

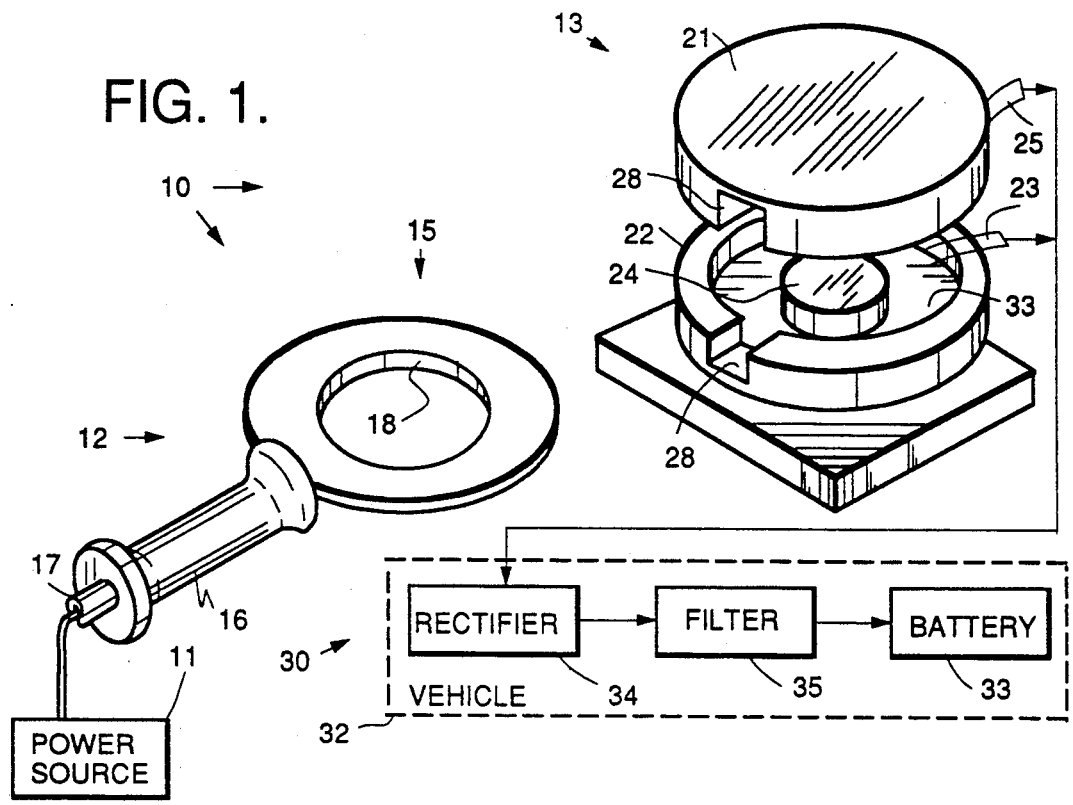

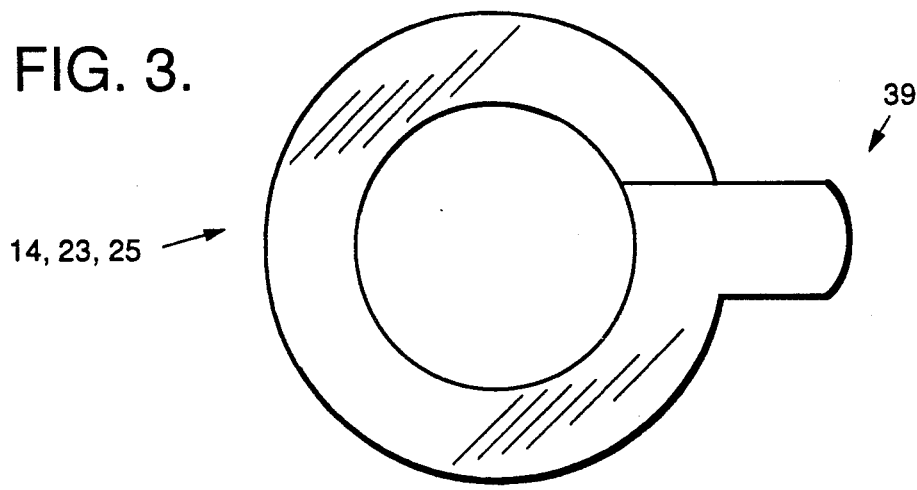
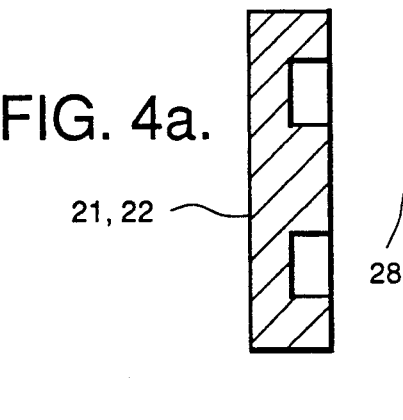
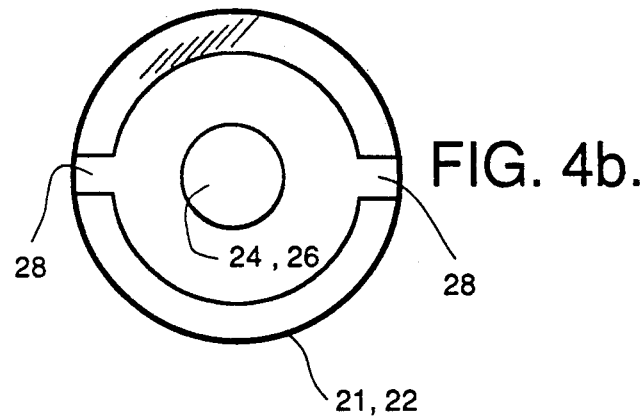
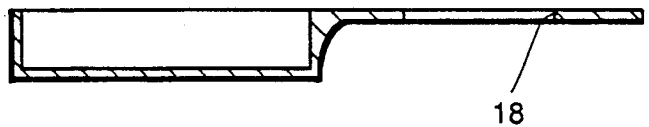
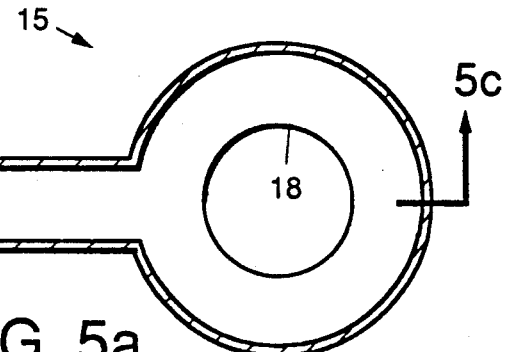

SEPARABLE INDUCTIVE COUPLER

BACKGROUND

The present invention relates to inductive couplers, and more particularly to a separable inductive coupler that is adapted for use with electric automobile propulsion battery charging systems, and the like.

With the development of electric powered automobiles and the push towards their production for relatively widespread consumer use within the next ten years, there is a need for a means to easily charge the propulsion batteries contained therein. Conventional battery charging devices are not well suited for this purpose. Conventional battery chargers are not designed for frequent use by consumers and thus it is not easy to charge a propulsion battery on a regular basis using conventional chargers.

A separable inductive coupler was developed by Hughes Aircraft Company for sub-sea applications by the U.S. Navy. This coupler operated at 60 Hz and thus the design was not optimized for high frequency or high power operation. The power transfer density or this coupler is about 2 Watts per cubic inch, which is insufficient to quickly recharge an automobile propulsion battery. This design is not well-suited for automobile applications.

Consequently, it is an objective of the present invention to provide for a separable inductive coupler that is adapted for use in an automobile propulsion battery charging device, or the like, that is simple to use and is adapted to efficiently charge an automobile battery employed to propel an electrically powered automobile. It is a further objective of the present invention to provide for a separable inductive coupler that provides for good high frequency operation at a high power density (>200 Watts/cubic inch).

SUMMARY OF THE INVENTION

In order to meet the above and other objectives, the present invention provides for a separable inductive coupler that provides a means for transferring electrical power across a dielectric medium using magnetic induction. The coil geometry of the present invention allows for easy disassembly of primary and secondary circuits. When primary and secondary coils are mated, an extremely low leakage inductance transformer is formed. This provides for good high frequency operation at a high power density.

More specifically, the separable inductive coupler is comprised of a primary coil and a secondary coil. For the purposes of the present disclosure, the removable coil is considered the primary. However, the role of primary and secondary coils may be reversed. The primary coil is removable and includes a housing made of an insulating material such as phenolic plastic, for example. The housing has a handle, and a primary winding having an opening is disposed therein. An electrical cable is coupled to the primary winding that is adapted to couple power thereto from an external power source.

The secondary coil includes first and second matable magnetic core sections, each core section having a secondary winding disposed therein that is couplable to a load. The load in an automotive application for which the present invention is designed typically comprises a rectifier, and a filter that are used to convert AC power into DC power that is stored in a propulsion battery, for example. The mating surfaces of the two core sections are smooth and flat so that the gap between them is minimized. This provides for maximum coupling and performance when the two core sections are mated. The first and second matable magnetic core sections are separable to provide for open and closed positions. The primary coil is insertable between the respective first and second matable magnetic core sections when they are in the open position. The primary and secondary coils form a transformer when the respective first and second matable magnetic core sections are in the closed position.

The separable inductive coupler of the present invention allows electrical power transfer without metal-to-metal contact. The design allows easy removal of the primary (or secondary) coil from the transformer. The coil geometry has very low leakage inductance and very low high-frequency resistance which permits high frequency operation. The power transfer density is much higher than previously achieved with separable inductive couplers. Approximately 6000 watts has been transferred through the present separable inductive coupler having a volume of 25.8 cubic inches, yielding a power density of 230 Watts/cubic inch.

The separable inductive coupler of the present invention provides a safe, convenient and weatherproof means for coupling power from a voltage source to an electric vehicle to recharge its propulsion battery.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a perspective view of a separable inductive coupler in accordance with the principles of the present invention;

FIGS. 2a and 2b show a cross sectional view of the primary and secondary coils and magnetic cores of the coupler of FIG. 1 having its primary cores open and closed, respectively;

FIG. 3 shows a detailed top view of the primary winding of FIG. 1;

FIGS. 4a and 4b show cross sectional and top views of the secondary core halves of FIG. 1, respectively;

FIGS. 5a and 5b show various detailed and cross sectional views of the primary coil of FIG. 1.

DETAILED DESCRIPTION

Figure 6:
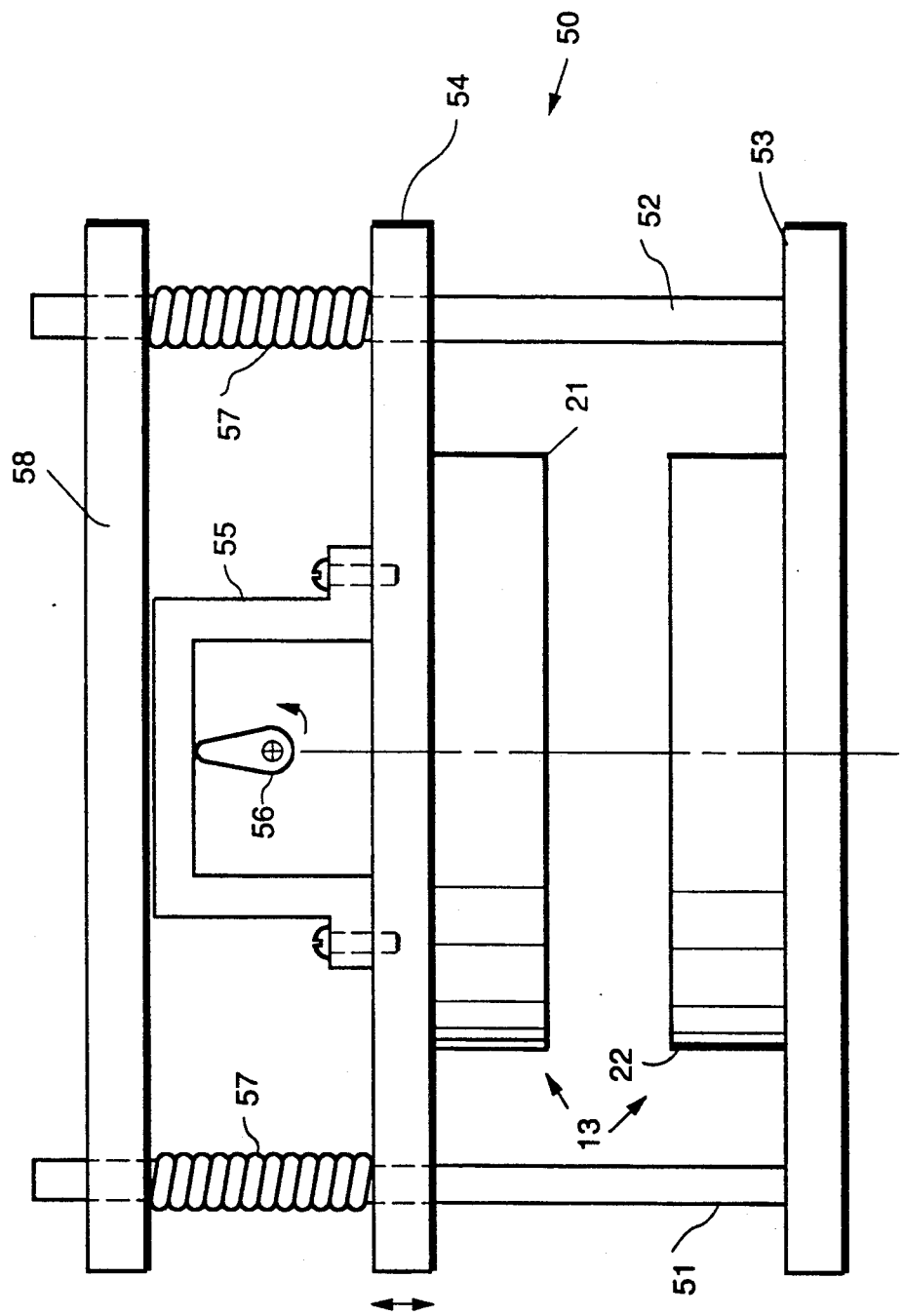
FIG. 6 shows a mechanism that is adapted to open and close the secondary core halves of the coupler of FIG. 1.

Referring to the drawing figures, FIG. 1 shows a perspective view of a separable inductive coupler 10 in accordance with the principles of the present invention. The separable inductive coupler 10 is adapted to provide a safe, convenient and weatherproof means for coupling power from a high frequency power source 11, such as an electronic power converter fed from a utility line, to a load 30. In an electric automobile application, for example, the present coupler 10 is adapted to couple power from the power source 11 to a vehicle 32 in order to recharge a battery 33 disposed in the vehicle that is used to propel the vehicle. The battery 33 is charged by way of a rectifier 34 and filter 35 serially coupled between the battery 33 and the separable inductive coupler 10 of the present invention. These components comprise the load 30.

FIG. 1 shows the inductive coupler 10 having a primary coil assembly 12 separated from a core assembly 13. FIGS. 2a and 2b show cross sections of the coupler 10 showing the primary coil assembly 12 inserted between respective upper and lower core sections 21, 22 of the core assembly 13, and wherein the respective core sections 21, 22 are opened (FIG. 2a) and closed (FIG. 2b). The primary coil assembly 12 is comprised of a copper winding 14 wound in a flat helix shaped member having a relatively small thickness (0.006 inch thick copper foil was used in a 6 KW demonstration prototype). The primary coil assembly 12 is housed in an insulated case 15 or housing 15 comprised of an insulating material such as phenolic plastic, for example. The case 15 has a handle 16 on one end thereof that is used to insert and remove the primary coil assembly 12 from the core assembly 13. The primary coil assembly 12 is connected to a high frequency (current or voltage) power source 11 by way of a coaxial cable 17 or other low inductance transmission line. The primary winding 14 is soldered or welded 17a to the leads of the coaxial cable 17. The power source 11 may comprise an electronic power converter fed from a utility line (40 kHz was used in a 6 KW demonstration model).

The core assembly 13 is comprised of upper and lower core sections 21, 22. Each core section 21, 22 comprises a magnetic core piece having a groove disposed therein into which respective secondary windings 23, 25 (FIG. 2a) are disposed. A flexible high temperature member 37, for example, is disposed between each respective core section 21, 22 in the bottom of each of the grooves and its respective secondary winding 23, 25. The flexible member member 37 may be made of high temperature rubber, for example. The flexible member member 37 is used to compensate for any manufacturing tolerance errors to ensure that the secondary windings 23, 25 come in close contact with the primary winding 14 when the assemblies 12, 13 are mated together. Ferrite material may be used for the for the upper and lower core sections 21, 22.

The mating surfaces of the two core sections 21, 22 should be made smooth and flat so that the gap between them is minimized. This provides for maximum coupling and performance when the two core sections 21, 22 are mated. Insulating material 19 is also disposed around the secondary windings 23, 25. Two center posts 24, 26 (FIG. 2a) are provided that insert into an opening 18 in the primary coil assembly 12 when the primary coil assembly 12 is mated with the core assembly 13.

Notches 28 are formed in the core sections 21, 22 that are used to locate the primary coil assembly 12 relative to the upper and lower core sections 21, 22 of the core assembly 13, and provide space for coil connections. It is to be understood that the shape of the notch 28 is not critical, but there must be a portion of each of the secondary core sections 21, 22 that is removed to permit insertion of the primary coil assembly 12 therebetween.

In the preferred embodiment shown in FIGS. 1 and 2, the secondary coils 23, 25 comprise two sections to improve the primary to secondary coupling coefficient. This reduces leakage inductance and reduces copper power losses due to proximity (eddy current) effects. However, it is to be understood that a single secondary coil may be used, but this may provide for less optimum performance.

With specific reference to FIGS. 2a and 2b, they show detailed cross sectional views of the primary coil assembly 12 and the upper and lower core sections 21, 22 of the secondary core assembly 13 of the coupler 10. FIG. 2a shows the coupler 10 having its secondary core sections 21, 22 open and closed, respectively. The respective windings 14, 23, 25 are shown encapsulated in the insulating material 19 and the respective locations of the windings 14, 23, 25, the opening 18 in the primary winding 14 and the insertion of the respective posts 24, 26 into the opening 18 are illustrated. Respective ends of the primary winding 14 and the secondary windings 23, 25 are shown coupled to the coaxial cable 17, and to the load 30. Two ends of the secondary windings 23, 25 are coupled together to complete the electrical connection. The center conductor and shield (ground) of the coaxial cable 17 are connected to respective ends of the primary winding 14 by means of high temperature solder, or other suitable welding material, for example, in a conventional manner.

It should be clear from FIGS. 2a and 2b that when the primary and secondary windings 14, 23, 25 are mated, the coupler 10 provides for a transformer mechanism that is relatively compact and provides an efficient means for coupling energy from the power source 11 to the battery 33 or load 30 coupled thereto. As was mentioned above, in an electric vehicle application, this load 30 is comprised of a high frequency rectifier 34 and filter 35 connected to a battery 33.

FIG. 3 shows a detailed top view of the primary and secondary windings 14, 23, 25 of the coupler 10 of FIG. 1. The windings 14, 23, 25 are comprised of one or more turns of copper, depending on the voltage and current levels required. In a demonstration model of the present invention, the primary and secondary windings 14, 23, 25 were comprised of ten turns of 0.006 inch thick copper having an outer diameter of approximately 3.35 inches and an inner diameter of approximately 1.90 inches. Two tangs 39 are provided to connect the windings 14, 23, 25 to the coaxial line 17 and load 30, and the upper tang 39 is shown. The other tang is disposed below the upper tang 39 and is hidden from view in FIG. 3.

FIGS. 4a and 4b show cross sectional and top views of one embodiment of the secondary core sections 21, 22 shown in FIG. 1. For the 6 KW demonstration model of the present invention, the core sections 21, 22 had an outer diameter of 4.49 inches and the outer wall thickness were about 0.50 inches. The center posts 24, 26 had a diameter of about 1.7 inches, for example. The respective windings 14, 23, 25 are located in the gap between the outer wall of each core section 21, 22 and the center post 24, 26.

FIGS. 5a and 5b show various detailed and cross sectional views of the housing 15 for the primary winding 14 of FIG. 1. The housing 15 is made of insulating material such as phenolic plastic, for example. The housing 15 has a wall thickness of approximately 0.125 inches in the area of the handle 16. In the area where the winding 14 is located, the outer diameter of a circular portion of the housing 15 is approximately 3.375 inches, for example. The opening 18 in the housing 15 has a diameter that is slightly less than that of the opening in the primary winding 14. The diameter of the opening 18 is about 1.72 inches, for example. The wall thickness where the winding 14 sits is about 0.30 inches thick. In FIG. 5b, an opening 41 for the coaxial cable 17 is provided in the handle 16.

FIG. 6 shows a mechanism 50 that is adapted to open and close the secondary core sections 21, 22 of the coupler 10 of FIG. 1. The mechanism 50 is employed to simplify the process of removing and reinserting the primary coil assembly 12 from and into the core assembly 13. The mechanism 50 is comprised of first and second posts 51, 52 that are secured to a lower mounting plate 53 that is secured to the lower core section 22 and to a top mounting plate 58. The first and second posts 51, 52 support a moveable upper mounting plate 54 or member that is attached to the upper core section 21. A U-shaped bracket 55 is also attached to the upper surface of the mounting plate 54. The upper mounting plate 54 is moveable by means of a rotatable cam 56 that is actuatable by means of a knob (not shown) for example. Rotation of the knob and cam 56 (illustrated by the arrow in FIG. 6) moves the mounting plate 54 up and down so that the upper and lower cores 21, 22 are mated and separated in response with the rotation thereof. Two springs 57 provide tensioning means that are employed to keep the mounting plate 54 and upper core 21 in the mated position.

In operation, when the respective primary coil assembly 12 and core assembly 13 of the coupler 10 are mated together, a conventional transformer is formed. The high frequency power source 11 causes a high frequency current to flow in the primary winding 14 which produces an AC flux in the magnetic core sections 21, 22. This changing flux produces a voltage in the secondary windings 23, 25 which causes current to flow if the load 30 such as the battery 33) is connected thereto.

A proof-of-concept prototype (demonstration model) of the separable inductive coupler 10 of the present invention was constructed and tested. The coupler 10 was driven by a conventional power electronic converter that supplied a 40 kHz quasi-square wave current thereto. Approximately 6600 watts was transferred through the coupler 10. Precise efficiency data was not available, but the power conversion efficiency was approximately 98%.

Thus there has been described new and improved separable inductive coupler that is adapted for use with electric automobile battery charging systems, and the like. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A separable inductive coupler comprising:
   a removable primary coil comprising a housing having a handle, a primary winding having an opening therein that is disposed in the housing, and an electrical cable coupled to the primary winding that is adapted to couple power thereto from an external power source; and
   a secondary coil comprising first and second matable magnetic core sections, each core section having a secondary winding disposed therein that is couplable to a battery, the first and second matable magnetic core sections being separable to provide for open and closed positions, and wherein the primary coil is insertable between the respective first and second matable magnetic core sections when they are in the open position, and wherein the primary and secondary coils form a transformer when the respective first and second matable magnetic core sections are in the closed position.

2. The separable inductive coupler of claim 1 which further comprises:
   insulating material encapsulating each of the respective primary and secondary windings.

3. The separable inductive coupler of claim 2 wherein the insulating material comprises nylon.

4. The separable inductive coupler of claim 1 wherein the respective coils are comprised of copper.

5. The separable inductive coupler of claim 4 wherein the respective coils are wound in a relatively flat helix shape.

6. The separable inductive coupler of claim 1 wherein the first and second matable magnetic core sections comprise ferrite material.

7. The separable inductive coupler of claim 1 which further comprises:
   opening means for opening and closing the secondary core halves of the coupler.

8. The separable inductive coupler of claim 7 wherein the opening means comprises:
   a moveable member attached to the upper core section;
   means for moving the moveable member up and down relative to the lower core section so as to alternatively mate and separate the upper core section from the lower core section; and
   tensioning means coupled to the moveable member for keeping the upper and lower core sections together when they are mated.

9. A separable inductive coupler comprising:
   a removable primary coil comprising a housing having a handle, a primary winding having an opening therein that is disposed in the housing, a first insulating material encapsulating the primary winding, and an electrical cable coupled to the primary winding that is adapted to couple power thereto from an external power source; and
   a secondary coil comprising first and second matable magnetic core sections, each core section having a secondary winding disposed therein that is couplable to a battery, a second insulating material encapsulating each of the secondary windings, the first and second matable magnetic core sections being separable to provide for open and closed positions, and wherein the primary coil is insertable between the respective first and second matable magnetic core sections when they are in the open position, and wherein the primary and secondary coils form a transformer when the respective first and second matable magnetic core sections are in the closed position.

10. The separable inductive coupler of claim 9 wherein the first and second insulating materials comprise nylon.

11. The separable inductive coupler of claim 9 wherein the respective coils are comprised of copper.

12. The separable inductive coupler of claim 11 wherein the respective coils are wound in a relatively flat helix shape.

13. The separable inductive coupler of claim 9 wherein the first and second matable magnetic core sections comprise ferrite material.

14. The separable inductive coupler of claim 9 which further comprises:

opening means for opening and closing the secondary core halves of the coupler.

15. The separable inductive coupler of claim 14 wherein the opening means comprises:
- a moveable member attached to the upper core section;
- means for moving the moveable member up and down relative to the lower core section so as to alternatively mate and separate the upper core section from the lower core section; and
- tensioning means coupled to the moveable member for keeping the upper and lower core sections together when they are mated.

16. A separable inductive coupler comprising:
- a removable primary coil comprising a housing having a handle, a copper primary winding having a relatively flat helix shape and having an opening therein that is disposed in the housing, a first insulating material encapsulating the primary winding, and an electrical cable coupled to the primary winding that is adapted to couple power thereto from an external power source; and
- a secondary coil comprising first and second matable magnetic core sections that each comprise ferrite material, each core section having a copper secondary winding having a relatively flat helix shape disposed therein that is couplable to a battery, a second insulating material encapsulating each of the secondary windings, the first and second matable magnetic core sections being separable to provide for open and closed positions, and wherein the primary coil is insertable between the respective first and second matable magnetic core sections when they are in the open position, and wherein the primary and secondary coils form a transformer when the respective first and second matable magnetic core sections are in the closed position.

17. The separable inductive coupler of claim 16 wherein the first and second insulating materials comprise nylon.

18. The separable inductive coupler of claim 16 which further comprises:
- opening means for opening and closing the secondary core halves of the coupler.

19. The separable inductive coupler of claim 18 wherein the opening means comprises:
- a moveable member attached to the upper core section;
- means for moving the moveable member up and down relative to the lower core section so as to alternatively mate and separate the upper core section from the lower core section; and
- tensioning means coupled to the moveable member for keeping the upper and lower core sections together when they are mated.

* * * * *